(12) United States Patent
Hein et al.

(10) Patent No.: US 7,826,969 B2
(45) Date of Patent: Nov. 2, 2010

(54) DETERMINING POSITION OF A VEHICLE WITH REFERENCE TO A LANDMARK

(75) Inventors: Thomas Kent Hein, Moline, IL (US); Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 985 days.

(21) Appl. No.: 11/644,392

(22) Filed: Dec. 21, 2006

(65) Prior Publication Data
US 2008/0154504 A1    Jun. 26, 2008

(51) Int. Cl.
G06F 19/00    (2006.01)
(52) U.S. Cl. .................. 701/217; 701/216; 701/225; 342/125
(58) Field of Classification Search .......... 701/200, 701/217, 216, 223, 225; 340/539.13, 435; 348/113, 118; 342/118, 125; 700/242; 318/568.12, 318/568.16
See application file for complete search history.

(56) References Cited

U.S. PATENT DOCUMENTS

| | | | |
|---|---|---|---|
| 5,999,866 A | 12/1999 | Kelly et al. | |
| 6,134,493 A | 10/2000 | Kaneko | |
| 6,240,342 B1 | 5/2001 | Fiegert et al. | |
| 6,453,223 B1 | 9/2002 | Kelly et al. | |
| 7,085,637 B2 * | 8/2006 | Breed et al. | 701/38 |
| 7,202,776 B2 * | 4/2007 | Breed | 340/435 |
| 7,222,004 B2 * | 5/2007 | Anderson | 701/22 |
| 7,299,056 B2 * | 11/2007 | Anderson | 455/456.1 |
| 7,299,057 B2 * | 11/2007 | Anderson | 455/456.1 |
| 7,313,404 B2 * | 12/2007 | Anderson | 455/456.1 |
| 7,522,995 B2 * | 4/2009 | Nortrup | 701/209 |

OTHER PUBLICATIONS

TagMaster Product Catalogue 2006/2007. [online] Retrieved from the Internet:<URL:http://www.tagmaster.com/download/brochures/Brouchure_Product_Catalogue_2006_HDseries.pdf>.
IDmicro Product Profile. 2100-B/C Readers. [online] Retrieved from the Internet:<URL:https://www.idmicro.com/pdf/2100-BC_Readers.pdf>.
Active RFID: Selecting the Optimal Frequency for Global Applications. A White Paper by Savi Technology. [online], Feb. 2002. Retrieved from the Internet:<URL:http://web.archive.org/web/20030702064045/http://www.savi.com/solutions/whitepapers/active_rfid.pdf>.
Patch, Kimberly. Radio tags give guidance. Technology Research News [online], Sep. 24/Oct. 1, 2003. [retrieved on Dec. 20, 2006]. Retrieved from the Internet:<URL:http://www.trnmag.com/Stories/2003/092403/Radis_tags_give_guidance_092403.html>.

* cited by examiner

Primary Examiner—Tran Khoi
Assistant Examiner—Ronnie Mancho (57) ABSTRACT

A position determining system for a vehicle comprises an imaging unit for collecting image data. A wireless device reads or interrogates a radio frequency identification tag. An identification module determines whether the collected image data contains a visual landmark. A confirmation module determines whether the identified visual landmark is associated with a corresponding radio frequency identification tag having a particular tag identifier. A range finder or distance estimator determines a position offset of the vehicle with respect to the identified visual landmark. A data processor determines a vehicular position of the vehicle based on the determined position offset and a stored reference position associated with at least one of the visual landmark and the radio frequency identification tag.

26 Claims, 9 Drawing Sheets

DETERMINING POSITION OF A VEHICLE WITH REFERENCE TO A LANDMARK

FIELD OF THE INVENTION

This invention relates to determining a position of a vehicle with reference to a landmark.

BACKGROUND OF THE INVENTION

A vehicle may comprise a robot that is used indoors, for example. In an indoor environment, reliable positioning data from a Global Positioning System (GPS) receiver with differential correction may not be available because of attenuation from a building or otherwise. Radio frequency beacons may produce unreliable or anomalous position readings indoors because of reflections, multi-path reception, attenuation, or other propagation issues.

Visual landmarks may provide inconsistent position information because of visual obstruction of the landmark, aliasing with similar landmarks, or corruption of the appearance of the visual landmark. For example, the distinguishing features of the visual landmark might be damaged or corrupted by mechanical contact with equipment or other items in a warehouse environment. Accordingly, there is a need for reliably determining the position of a vehicle with respect to a landmark (e.g., a visual landmark).

SUMMARY OF THE INVENTION

A position determining system for a vehicle comprises an imaging unit for collecting image data. A wireless device reads or interrogates a radio frequency identification tag. An image processor determines whether the collected image data contains a visual landmark. A confirmation module determines whether the identified visual landmark is associated with a corresponding radio frequency identification tag having a particular tag identifier. A range finder or distance estimator determines a position offset of the vehicle with respect to the identified visual landmark. A data processor determines a vehicular position of the vehicle based on the determined position offset and a stored reference position associated with at least one of the visual landmark and the radio frequency identification tag.

DESCRIPTION OF THE PREFERRED EMBODIMENT

Figure 1:
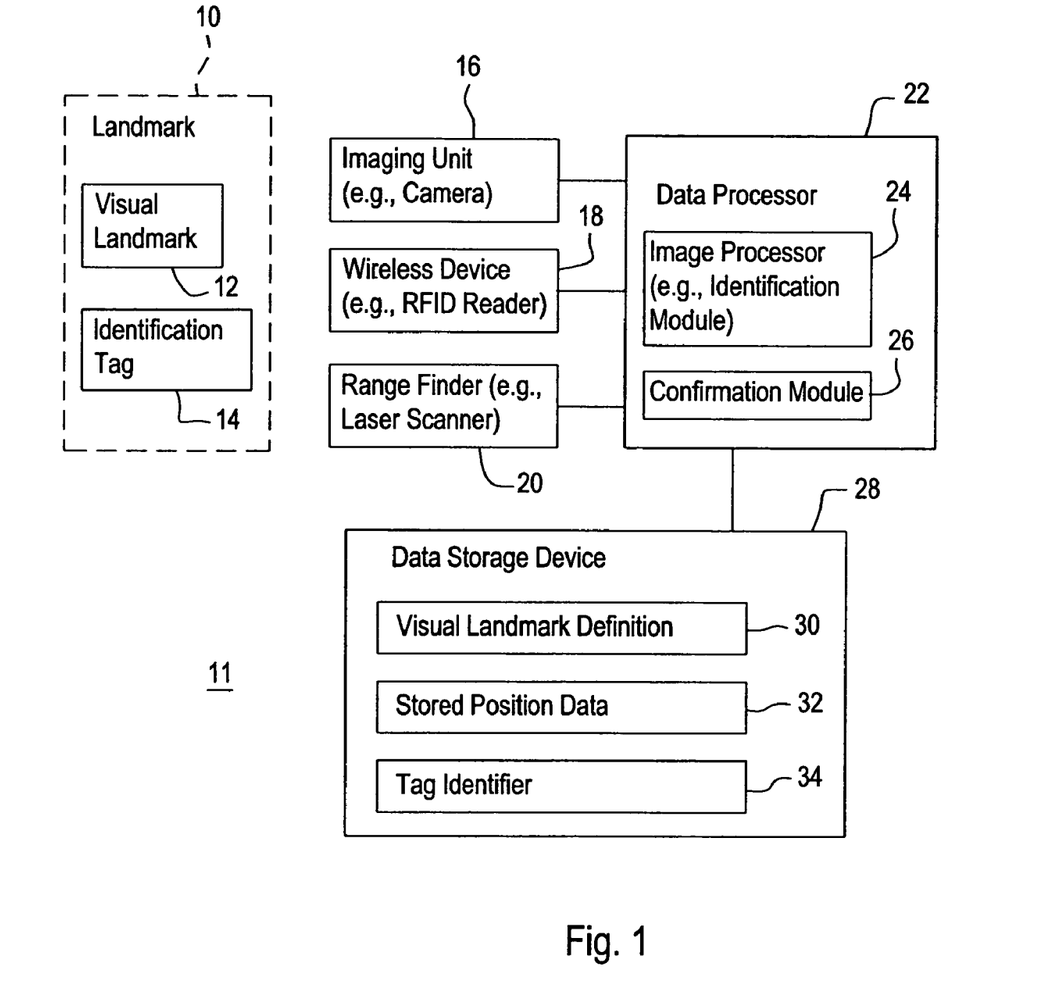
FIG. 1 is a first embodiment of a block diagram of a system for determining a position of a vehicle with reference to a landmark.

In accordance with one embodiment, FIG. 1 illustrates a system 11 for determining a vehicular position or vehicular location of a vehicle with reference to a landmark 10. The vehicular position may represent an absolute position or a position referenced to an arbitrary reference location that is defined by a user, for example. The system 11 is associated with or mounted on a vehicle. A vehicle may refer to a manned vehicle, an unmanned vehicle, an autonomous vehicle, a robotic vehicle, a robot, a machine, or other equipment.

The landmark 10 comprises a visual landmark 12, a radio frequency identification (RFID) tag 14, or both. For example, the landmark 10 may comprise a visual landmark 12 associated with an embedded or attached radio frequency identification tag 14. Each visual landmark 12 is coded or arranged with a distinctive visual appearance to facilitate distinguishing each visual landmark 12 from the others. In one embodiment, multiple landmarks 10 with corresponding known reference positions or reference locations (e.g., coordinates) may be deployed or distributed throughout a work area to facilitate determination of the position of a vehicle by the system 11. The work area may be indoors or outdoors, or may include both an indoor area and an outdoor area.

The system 11 of FIG. 1 comprises a data processor 22 that communicates with one or more of the following devices: an imaging unit 16, a wireless device 18, and a range finder 20. The data processor 22 is coupled to a data storage device 28. In one embodiment, the data storage device 28 stores a visual landmark definition 30, stored position data 32, and a tag identifier 34. The data processor 22 comprises an image processor 24 (e.g., identification module) and a confirmation module 26.

The imaging unit 16 may comprise a camera or another imaging device. In one embodiment, the imaging unit 16 collects image data of a scene within a visible light spectrum, an infra-red light spectrum, or both. In other embodiments, the imaging unit 16 may collect image data within the near-infra-red spectrum, the ultraviolet light spectrum, or a band within the visible light spectrum. The imaging unit 16 may be associated with an adjustable lens that can vary its focal length within a certain range, between a lower focal length and an upper focal length. The imaging unit 16 provides image data or an image signal as input data to the data processor 22 (e.g., the image processor 24).

The wireless device 18 may comprise a radio frequency identification (RFID) reader that is capable of reading a radio frequency identification (RFID) tag 14. Upon reading of the identification tag 14 of the landmark 10, the wireless device 18 may provide a corresponding tag identifier 34 associated with the identification tag 14. The wireless device 18 provides the tag identifier 34 to the data processor 22 or confirmation module 26 as input data.

The range finder 20 may comprise a laser range finder, a scanning laser range finder, laser radar, ladar, or another range finder for determining a generally linear displacement between the range finder 20 and the landmark 10, and a multidimensional angular bearing associated with the displacement. The multidimensional angular bearing may be expressed as a yaw angle, a pitch angle, and a roll angle. Yaw refers to a heading of the vehicle; pitch refers to tilting front to aft, or vice versa of the vehicle; and roll angle refers to tilting from side to side. In one embodiment, the range finder 20 may determine two or three dimensional coordinates of the landmark 10, or a portion thereof, with respect to the reference coordinates of the imaging unit 16 or vehicle. The range finder 20 provides such two or three dimensional coordinates or other position offset data to the data processor 22. The range finder 20 determines a position offset of the vehicle with respect to the landmark position. Accordingly, the data processor 22 may determine the vehicular position based on the landmark position and the position offset.

In one embodiment, the data storage device 28 stores a visual landmark definition 30, stored position data 32, a tag identifier 34, and a visual identifier. The visual landmark definition 30 provides a definition of the visual appearance of the landmark. The landmark definition may define one or more of the following: a size of the landmark or portions thereof, landmark dimensions, pattern dimensions, one or more pattern sizes, a pattern description, one or more pattern colors, a color definition (e.g., RGB or HSV color space), a boundary definition, a perimeter definition, a shape definition, a reference centroid, a reference major axis length, a reference minor axis length, a reference color palette, and a reference orientation, and any other appearance characteristics. The landmark definition may include definition of colors that appear in the visual landmark 12, and their respective positions in a pattern, for example. The landmark definition may also describe the dimensions or ratios of different color regions of the visual landmark 12. Distinct visual landmarks 12 with different colors or patterns may be positioned in a work area in which the vehicle roams (e.g., on an autonomous or remote controlled basis).

The colors may be defined in color space, such as RGB (red-green-blue) color space or HSV (hue-saturation-value) color space. RGB color space refers to model for defining a desired color where red, green and blue values are mapped into three dimensions in which red is associated with an X axis, green is associated with the Y axis, and blue is associated with the Z axis. The HSV color space is similar to the RGB color space, except the hue is associated with the X axis, saturation is associated with the Y axis, and brightness is associated with the Z axis. The hue represents a color, which may also be defined by red, green and blue components. The saturation represents the intensity of a specific hue. Saturation may be expressed based on a level of grayness associated with the pure hue, for instance. Value or brightness represents the perceived luminance of an object. Colors in color space may be encoded as a representation (e.g., a binary representation, byte or word) for processing by the data processor 22 or another image processor.

Each visual landmark 12 may be associated with or assigned a corresponding visual identifier that uniquely identifies the visual landmark 12. The visual identifier may be expressed as a code, alphanumeric numbers, symbols, words, a binary code, a hexadecimal code, or otherwise. Each visual identifier may be associated with corresponding reference visual position data, which represents a known location for a respective visual landmark.

Each identification tag 14 (e.g., radio frequency identification tag) may be associated with or assigned a corresponding tag identifier 34. The tag identifier 34 may be expressed as a code, alphanumeric numbers, symbols, words, a binary code, a hexadecimal code, or otherwise. Each tag identifier 34 may be associated with corresponding reference radio frequency position, which represents a known location for the respective identification tag 14.

The stored position data 32 refers to visual reference position data, radio frequency reference position data, or both. A landmark identifier generally refers to a visual identifier, a tag identifier, or both. In one embodiment, the visual identifier and corresponding visual reference position, and the tag identifier and the corresponding radio frequency reference position, are organized into a database (e.g., a relational database) or hierarchical data structure for storage in the storage device 28. In another embodiment, the visual identifier and corresponding visual reference position, and the tag identifier and the corresponding radio frequency reference position, are organized into a table, a map, map data, or another data structure for storage in the storage device 28. For example, for the work area, or a portion thereof, a list of landmarks 10 and corresponding landmark identifiers and corresponding stored position data 32 (e.g., two or three dimensional coordinates) may be stored in the storage device 28.

The image processor 24 may comprise one or more of the following items: an identification module, a color differentiation module, an edge detector, a linear detector, and a feature detector. The image processor 24 may comprise an imaging processing program or toolset. In one embodiment, the image processing program or toolset may comprise MATLAB (e.g., MATLAB release) and/or the related Image Processing Toolbox. MATLAB refers to a programming language that supports mathematical computations, such as matrix calculations and numerical analysis. A color differentiation module distinguishes the visual landmark pixels from the background pixels of an image. An edge detector identifies edges of the visual landmark 12, or portions thereof. A linear detector for identifies related linear arrays of pixels in the linear landmark or image data.

An edge detector refers to a detector that can detect an edge of an object or visual landmark 12, or a portion of the visual landmark 12, within image data. For example, the edge detector may estimate the presence of an edge in the image data where the intensity or illumination of adjacent pixels meets or exceeds a certain threshold of change in value. The edge detector may search for a maximum of a first derivative of pixel intensity of an area within an image to locate an edge of the visual landmark 12. If a border of visual landmark 12 is white or another color with high intensity, illumination or brightness values the edge detector may readily determine the boundary or edge of the visual landmark 12.

A feature detector is used to detect generally linear feature, curved feature, or another geometric pattern of a group of pixels within the image data or associated with the visual landmark 12. For example, the feature detector may comprise a linear detector that uses a Hough transform to identify a generally linear feature in the image data, or within the visual landmark 12.

In an alternate embodiment, the data processor 22 or confirmation module 26 may compare first stored position data 32 associated with the landmark identifier to second stored position data 32 associated with the tag identifier 34 to determine if the first stored position data 32 matches the second stored position data 32. The data processor 22 or confirmation module 26 confirms or establishes the landmark position of the landmark if first stored position data 32 matches the second stored position data 32. The landmark position or stored position data 32 may be expressed as two or three dimensional coordinates, for example.

As a vehicle (equipped with the system 11) approaches the landmark 10, the imaging unit 16 collects image data. The data processor 22 or image processor 24 (e.g., identification module) distinguishes the visual landmark 12 from background data of the collected image data (e.g., a scene). The image processor 24 (e.g., identification module) may use color discrimination and/or shape discrimination to distinguish the visual landmark 12 from the background data with reference to the visual landmark definition 30. Further, the visual data processor 22 or image processor 24 identifies the particular corresponding tag identifier 34 or landmark identifier associated with the respective landmark definition. Each landmark identifier or tag identifier 34 is associated with stored position data 32 of the particular identified landmark.

The data processor 22 or confirmation module 26 receives a tag identifier 34 from the wireless device 18 (e.g., radio frequency identification reader). Each tag identifier 34 is associated with stored position data 32 of the particular identified landmark 16. Accordingly, the data processor 22 or confirmation module 26 may compare the tag identifier 34 to the visual identifier to determine if the tag identifier 34 and the visual identifier are associated with the same landmark 10. In one embodiment, the data processor 22 or confirmation module 26 confirms or establishes the landmark position of the landmark 10 as authenticated (or with a high reliability level) if the tag identifier 34 and the landmark identifier are associated with the same landmark 10. The landmark position or stored position data 32 may be expressed as two or three dimensional coordinates (e.g., in accordance with a Cartesian coordinate system or a polar coordinate system).

Figure 2:
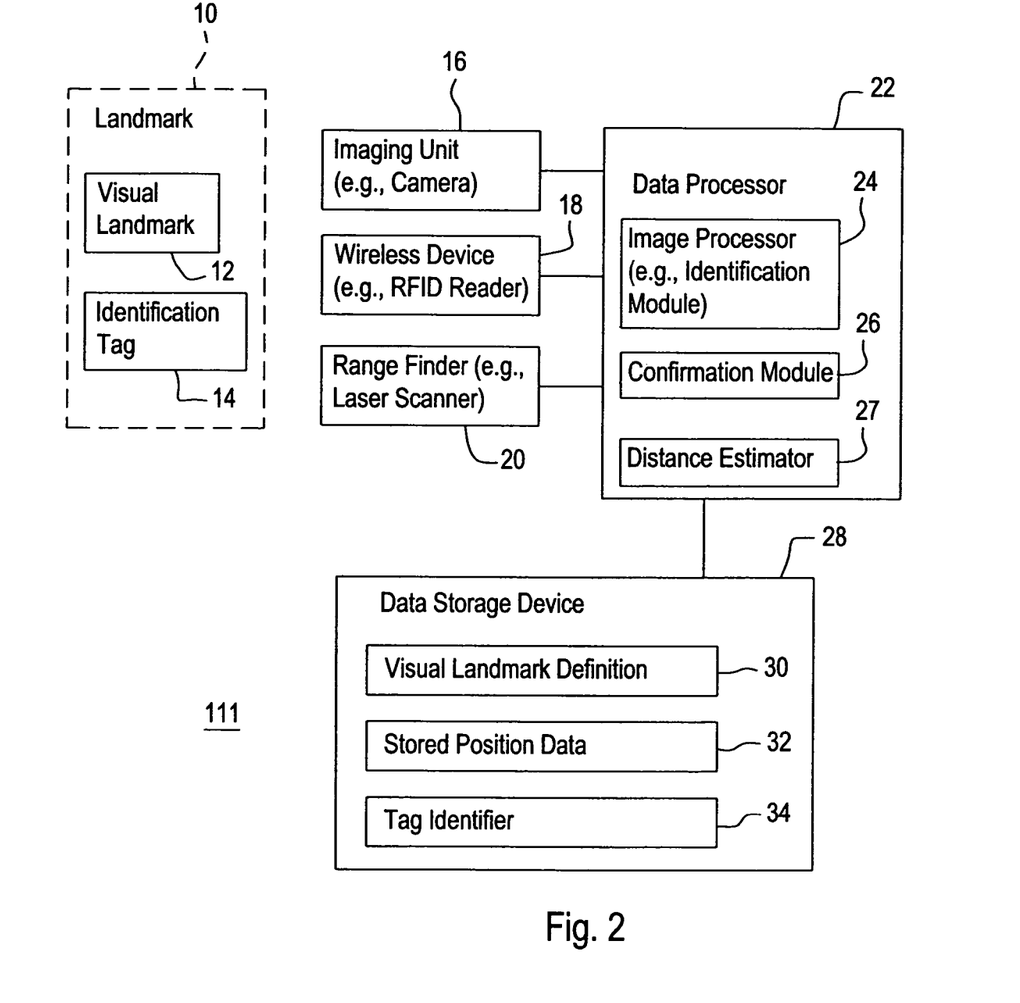
FIG. 2 is a second embodiment of a block diagram of a system for determining a position of a vehicle with reference to a landmark.

The system 111 of FIG. 2 is similar to the system 11 of FIG. 1, except the system 111 of FIG. 2 deletes the range finder 20 and further comprises a distance estimator 27. The distance estimator 27 cooperates with the imaging unit 16 to estimate the offset position or distance and angular orientation between the vehicle and the landmark (e.g., the visual landmark 12). For the configuration of FIG. 2, the imaging unit 16 comprises a variable or adjustable lens with an adjustable focal length.

If the range finder 20 is not available (e.g., not functioning with a desired level of reliability) to establish a distance and bearing to the visual landmark 12 (e.g., a reference point or center of the visual landmark 12) for determination of position data of the vehicle, then the data processor 22 or distance estimator 27 may conduct further analysis of the image data to determine the distance and bearing between the visual landmark 12 and the imaging unit 16 (or the vehicle associated with the imaging unit 16). The field of view setting, lens setting, or lens focal length setting of the imaging unit 16 and the corresponding image size (e.g., expressed in pixels) of the collected image data may be used along with the a priori knowledge of the visual landmark 12 or the visual landmark definition 30 to estimate the distance between the visual landmark 12 and the imaging unit 16. Further, the distance estimator 27 may use a linear detector to detect a linear feature of a visual landmark 12 and a counter or estimator to count the associated number of pixels associated with the detected linear feature. The visual landmark definition 30 may include a reference number of pixels of a generally linear feature of the visual landmark 12 or candidate visual landmark 12 at a known distance or separation between the imaging unit 16 and the visual landmark 12 at a given lens setting or camera setting. The generally linear feature may represent the major axis and minor axis, given a defined orientation when the imaging unit 16 has a corresponding known lens setting or lens focal length setting.

In an alternate embodiment, the imaging unit 16 may collect one or more images of a scene from the same vehicular position, but with different lens adjustments or focal lengths. The data processor 22 or distance estimator 27 estimates the distance between the vehicle and the visual landmark 12 based on the known lens settings, focal lengths and the collected images (e.g., number of linearly arranged pixels associated with the visual landmark 12).

Figure 3:
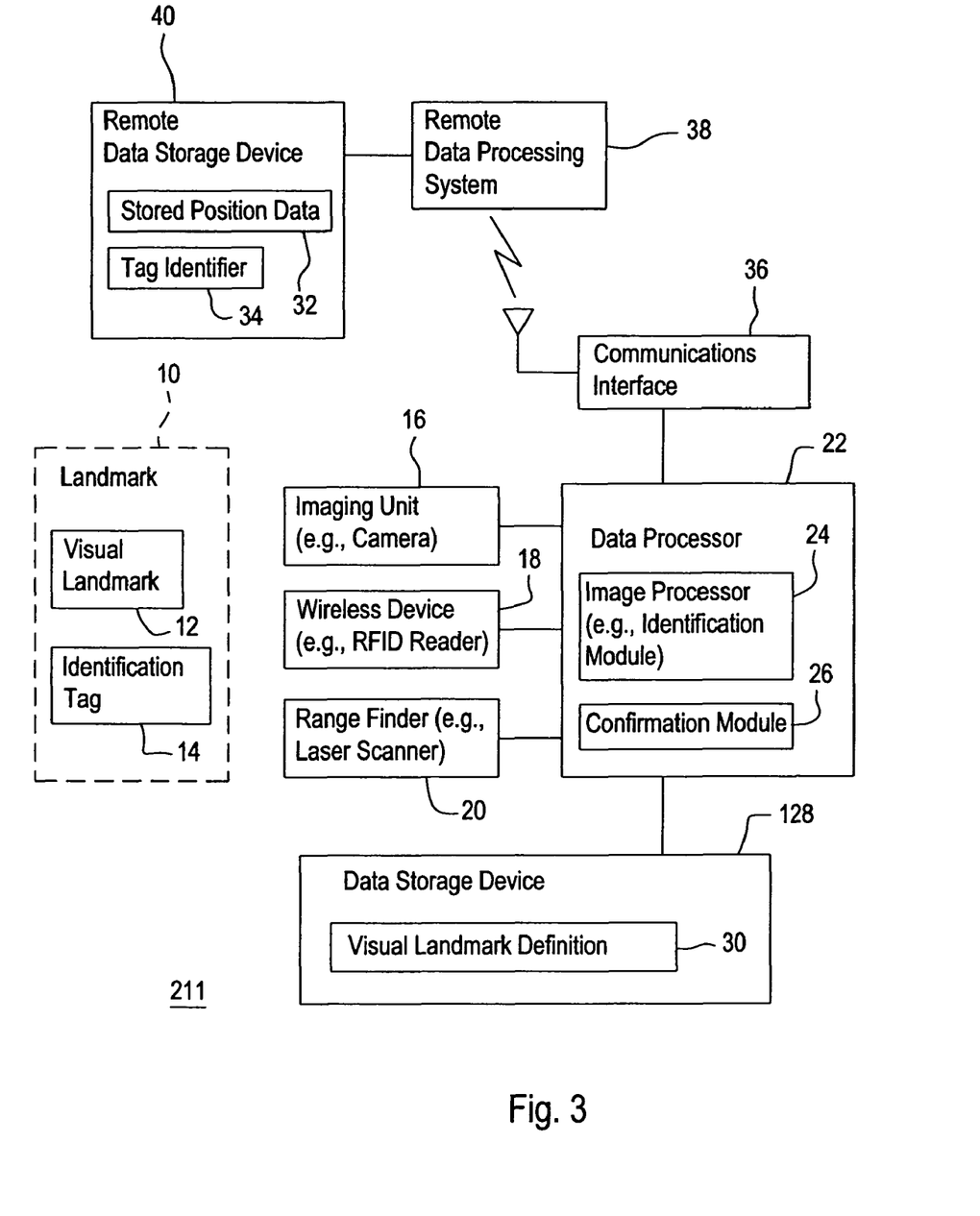
FIG. 3 is a third embodiment of a block diagram of a system for determining a position of a vehicle with reference to a landmark.

The system 211 of FIG. 3 is similar to the system 11 of FIG. 1, except the system 211 of FIG. 3 further comprises a communications interface 36, among other things. The communications interface 36 comprises a wireless communications device or another communications device that communicates with a remote data processing system 38. The remote data processing system 38 is coupled to a remote data storage device 40 for storing stored position data 32 and a corresponding tag identifier 34, for example.

In an alternate embodiment, the communications interface 36 may access remote maps or a database for the vehicle.

The data storage device 128 of FIG. 3 may store a visual landmark definition 30 associated with the visual landmark 12. In an alternate embodiment, the data storage device 128 may store stored position data 32 associated with a corresponding visual landmark 12. Accordingly, if the communications interface 36 is unable to communicate reliably with the remote data processing system 38, a preliminary position of the vehicle may be established. The preliminary position of the vehicle may have a lower confidence of reliability or accuracy, than a confirmed position of the vehicle that is confirmed based on cross-checking of visual identifier with the tag identifier 34 (e.g., radio frequency identification tag 14). The stored position data 32 is available from accessing the remote data storage device 40, or otherwise.

Figure 4:
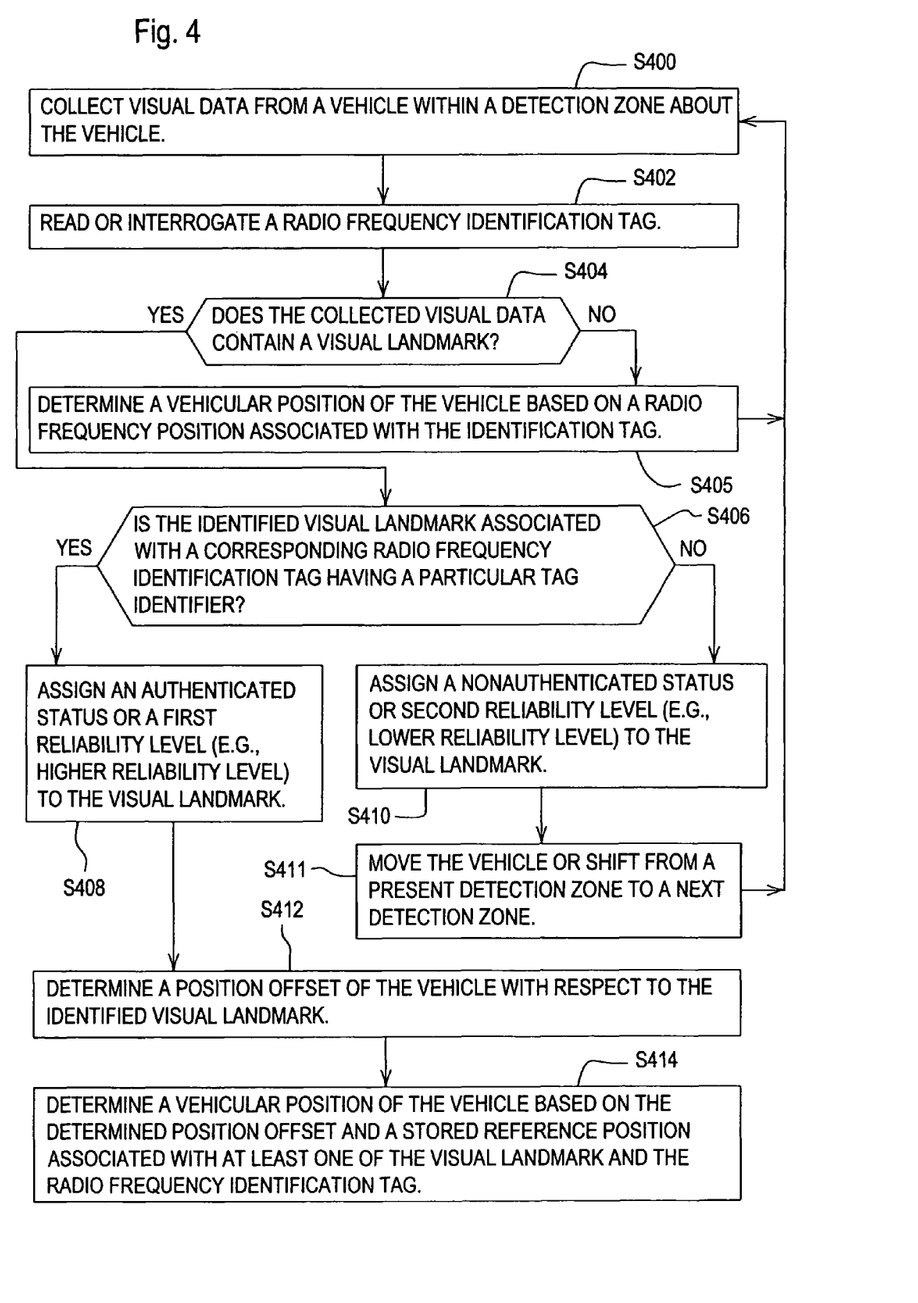
FIG. 4 is a flow chart of one embodiment of a method for determining the position of a vehicle with reference to a landmark.

FIG. 4 discloses a method for determining the position of a vehicle with reference to a landmark. The method of FIG. 4 begins in step S400.

In step S400, an imaging unit 16 collects image data within a detection zone about a vehicle. The imaging unit 16 is associated with or mounted on a vehicle. The image data may comprise one or more images collected in a detection zone or a work area. The detection zone may comprise a field of view of the imaging unit 16, for example. The images or image data may be time-stamped or stored sequentially to indicate relative or absolute time. The image data may be represented in color space, such as RGB color space or HSV color space.

In one embodiment, as a vehicle moves through a work area, the data processor 22 may expect a landmark 12 that would cause the imaging unit 16, the range finder 20, wireless device 18 (e.g., radio frequency identification reader) or another sensor to focus on a preferred direction or azimuth with the detection zone, or the data processor 22 may instruct the imaging unit 16, range finder 20, wireless device 18 (e.g., radio frequency identification reader) or another sensor to continuously scan the environment visually.

In step S402, a wireless device 18 or radio frequency identification reader reads or interrogates a radio frequency tag associated with a landmark 10.

In step S404, the identification module 24 or data processor 22 determines whether the collected image data contains a visual landmark 12. For example, the identification module 24 or data processor 22 uses color discrimination, edge detection, feature detection, pattern recognition or another image data processing technique to identify visual landmark pixels, or distinguish between the visual landmark pixels and background image data. Visual landmark pixels or a visual landmark 12 may be identified by compliance with a visual landmark definition 20. The visual landmark definition 30 may describe the color values or color content, shape of regions, dimensions of the regions, or other visual attributes of the visual landmark 12.

If the collected image data contains a visual landmark 12, the method continues with step S406. However, if the collected image data does not contain a visual landmark 12, the method continues with step S405.

In step S405, the data processor 22 determines a vehicular position of the vehicle based on a radio frequency position associated with the identification tag 14. In general, the vehicular position based on the identification tag 14, and not the visual landmark 12, may have a lower degree of precision or reliability because determining an offset of the vehicular position with respect to the radio frequency position of the identification tag 14 is less precise than determining an offset of the vehicular position based on the visual landmark 12. In particular, the data processor 22 may be associated with a received signal strength indicator for determining a signal strength of a radio frequency signal transmitted by a respective identification tag 14. Because the signal strength generally varies inversely with the distance from the identification tag 14, an estimate of the distance may be obtained from a corresponding signal strength detected at the system (e.g., 11). For example, the system may, first, detect a signal strength by a signal strength determining receiver and, second, refer to a look-up table, chart, graph or equation that defines the relationship between received signal strength and distance between the identification tag 14 and the system or vehicle.

In the event that the visual landmark 12 is not seen because of the viewing angle, an obstruction, or defective imaging unit, knowledge of the propagation range or signal strength transmitted by the identification tag 14 to the wireless device 18 may be used to estimate a vehicular location or position. The vehicle may need to move about the work area to generally circle about the identification tag 14 or landmark to verify the location only using the transmission signal strength associated with the identification tag 14.

In step S406, the data processor 22 or confirmation module 26 determines whether the identified visual landmark 12 is associated with a corresponding radio frequency identification tag 14 having a particular tag identifier 34. For example, the data processor 22 or confirmation module 26 institutes a confirmation process or authentication process to validate or confirm that the tag identifier 34 (associated with the identification tag 14) is consistent with a visual identifier (associated with the visual landmark 12). The tag identifier 34 and the visual identifier may represent a code, a word, a byte, a number, an alpha numeric indicator, or a symbol that is assigned or defined by a user. If the identified visual landmark 12 is associated with a corresponding radio frequency identification tag 14 having a particular tag identifier 34, the method continues with step S408. However, if the identified visual landmark 12 is not associated with a corresponding radio frequency identification tag 14 having a particular tag identifier 34, the method continues with step S410.

In step S408, the data processor 22 assigns an authenticated status or first reliability level (e.g., higher reliability level) to the visual landmark 12, or visual identifier associated with the visual landmark 12.

In step S410, the data processor 22 assigns a non-authenticated status of second reliability level (e.g., lower reliability level) to the visual landmark 12, or a visual identifier associated with the visual landmark 12.

Step S411 follows step S410. In step S411, the vehicle moves or shifts from a present detection zone to a next detection zone. For example, the vehicle itself may move or an imaging unit 16 may be panned, zoomed, titled, or otherwise moved to collect image data within a next detection zone. The next detection zone may overlap with the prior detection zone, may be adjacent to the prior detection zone, may be spaced apart from the detection zone, or otherwise. After step S411, the method continues with step S400.

In step S412, the range finder 20, data processor 22, or both determines a position offset of the vehicle with respect to the identified visual landmark 12. For example, if the landmark 10 is wall or post mounted, the range finder 20 may determine the bearing and range to the landmark to facilitate determination of the vehicular position. The position offset may describe a generally linear distance or vector between the range finder 20 or system (11, 111 or 211) and the identified visual landmark. The vector may be defined in terms of a distance (or magnitude) and an associated yaw angle, tilt angle, and roll angle, for example. The position data (e.g., coordinates) of the identified visual landmark 12 may be obtained from a data storage device 28 (e.g., or the remote data storage device 40 via the communications link) based on query with a visual identifier or tag identifier 34.

In step S414, the data processor 22 determines a vehicular position of the vehicle based on the determined position offset and a stored reference position associated with at least one of the visual landmark 12 and the radio frequency identification tag 14. Step S412 may be carried out by various techniques that may be applied alternately, or cumulatively. Under a first technique, the data processor 22 determines the vehicular position based on a visual reference position associated with the visual landmark or landmark 10 and the position offset. Under a second technique, the data processor 22 determines the vehicular position based on a radio frequency reference position based on a radio frequency position associated with the identification tag 14 and the position offset. Under a third technique, the data processor 22 determines the vehicular position based on the visual reference position, the radio frequency reference position, and the position offset. In the third technique, the average of the visual reference position and the radio frequency reference position may be used, or the visual reference position or the radio frequency reference position may be used.

Figure 5:
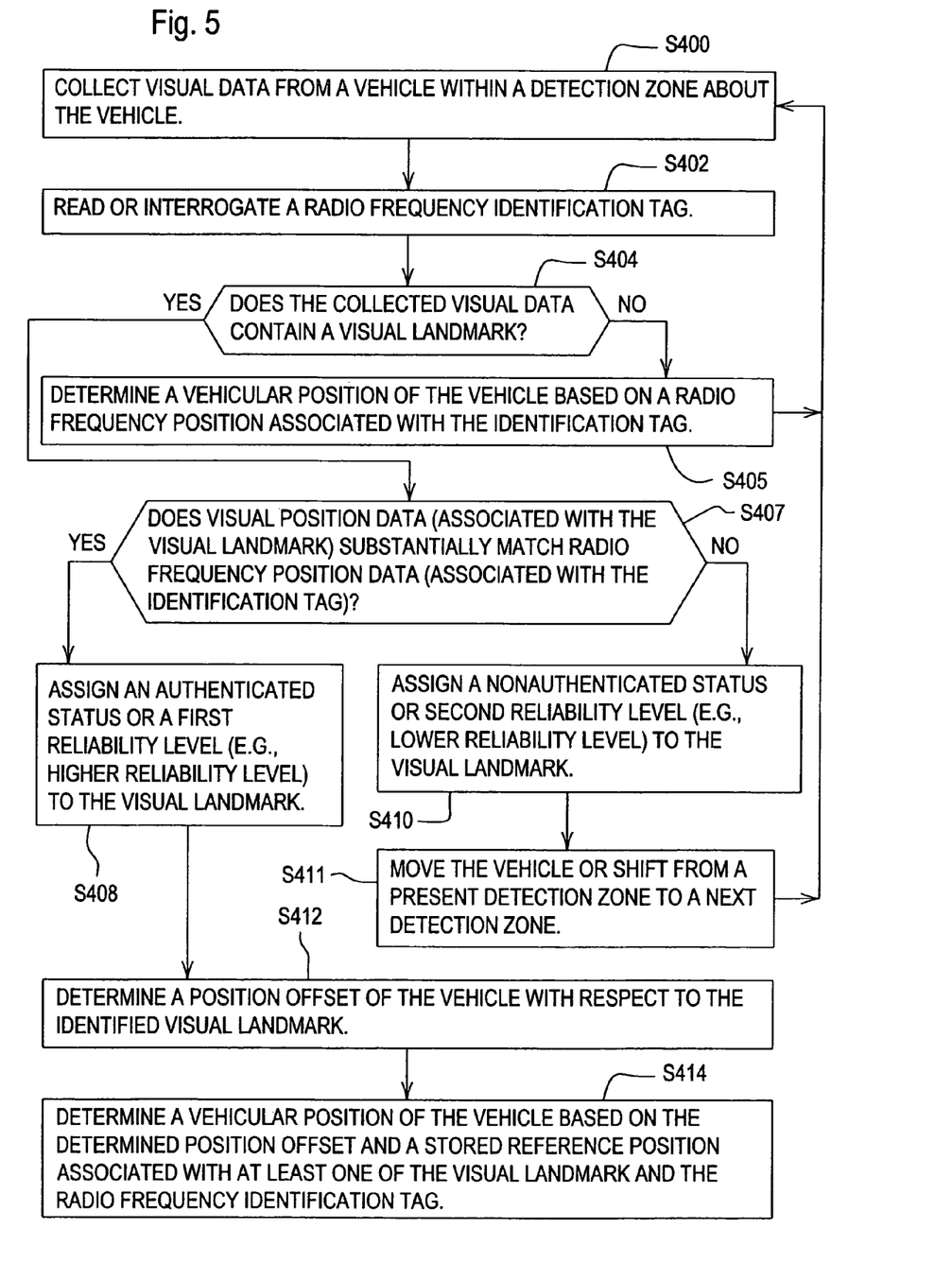
FIG. 5 is a flow chart of another embodiment of a method for determining the position of a vehicle with reference to a landmark.

The method of FIG. 5 is similar to the method of FIG. 4, except the method of FIG. 5 replaces step S406 with step S407. In step S407, the data processor 22 determines whether the visual position data (associated with the visual landmark 12) substantially matches radio frequency position data (associated with the identification tag 14). If the data processor 22 determines that the visual position data substantially matches the radio frequency position data, the method continues with step S408. However, if the data processor 22 determines that the visual position data does not substantially match the radio frequency position data, the method continues with step S410.

Figure 6:
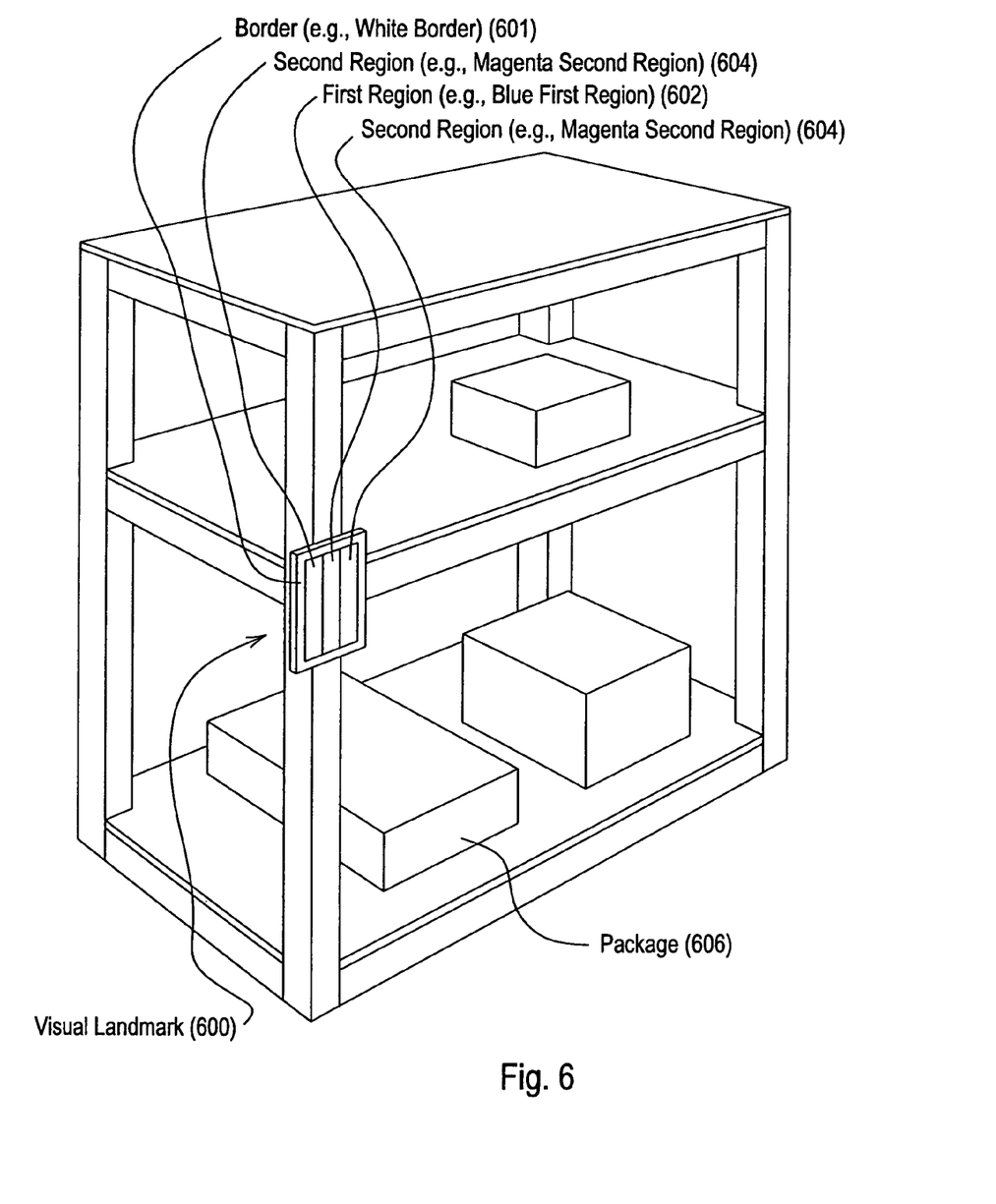
FIG. 6 is an illustrative example of one possible embodiment of a landmark.

FIG. 6 shows one possible visual landmark 600. The visual landmark 600 may represent an illustrative example or subset of visual landmark 12, for instance. Accordingly, references in this document to visual landmark 12 generally apply equally to visual landmark 600. Although the visual landmark 600 is mounted on or associated with a rack in a warehouse, the visual landmark 600 may be mounted to a post, beam, building, or other structural support. As illustrated, the visual landmark 600 has a first region 602 (e.g., first vertical bar) with one or more second regions 604 (e.g., second vertical bars) that are distinct in color from the first region 602. Here, for instance, the first region 602 is generally blue, whereas the second regions are generally magenta or a similar shade or color value. However, it is understood that other colors, shapes, and arrangements of the first region 602, the second region 604, and the visual landmark 600 may be used to practice the invention. In the example, the first region 602 and the second regions 604 are surrounded by a margin or border 601 (e.g., a white or light colored border), which may have a distinctive color different from those of the first region 602 and second region 604. The border 601 may be used to facilitate identification 9 (e.g., edge detection) of the visual landmark 600 or its edges from background image data, but the border 601 may be deleted in alternative embodiments that rely on other aspects of the visual landmark for identification of the landmark or its edges. The radio frequency identifier may be mounted on a back side of the visual land mark 600.

In one embodiment, the colors in the visual landmark (e.g., visual landmark 600 of FIG. 6 or visual landmark 12 of FIG. 1) may be selected to be generally unique or less common for the applicable environment. For example, an operation environment of the vehicle or vehicle work area may be imaged or scanned to determine the most prevalent colors (e.g., those colors associated with packages 606 or a warehouse) in the scenes that define the operational environment. One or more colors of the visual landmark (e.g., visual landmark 12 or visual landmark 600) may be selected to be complementary or opposite to the prevalent colors on a color wheel. The size or dimensions of the landmark is generally selected based on the resolution of the imaging unit 16 and the maximum desired distance of detection between the imaging unit 16 and the visual landmark (e.g., visual landmark 12 or visual landmark 600) with a desired degree of reliability.

Figure 7:
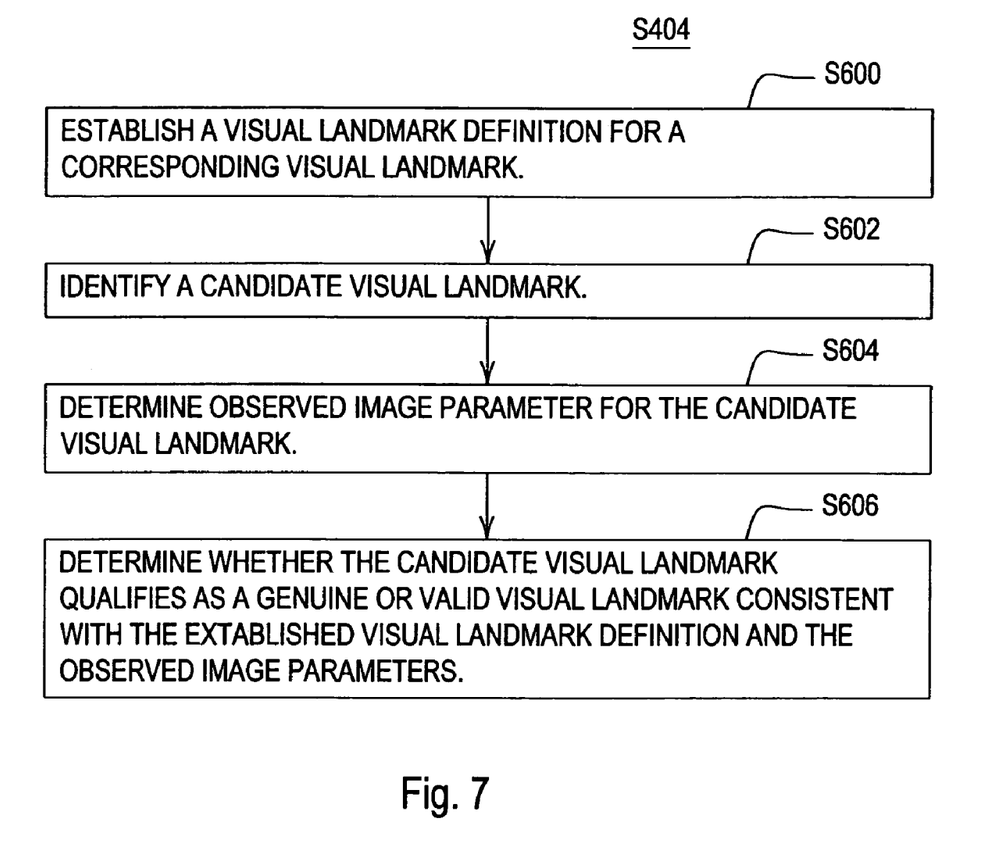
FIG. 7 illustrates a method for identifying a visual landmark.

FIG. 7 illustrates a method for identifying a visual landmark 12 or visual landmark 600. The method of FIG. 7 represents an illustrative procedure for determining whether the collected visual data contains a visual landmark in accordance with step S404 of FIG. 4 or FIG. 5. The method of FIG. 7 beings in step S600.

In step S600, a data processor 22 or image processor 24 (e.g., identification module) establishes a visual landmark definition 30 for a corresponding visual landmark 12. For example, a user may enter or select a visual landmark definition 30 from a user interface coupled to the data processor 22. The visual landmark definition 30 may comprise one or more of the following reference image parameters: a reference centroid, a reference major axis length, a reference minor axis length, a reference color palette, and a reference orientation with respect to the visual landmark 12, or a portion thereof. The visual landmark definition 30 may be stored in the data storage device 28.

In step S602, the data processor 22 identifies a candidate visual landmark 12. For example, the data processor 22 or image processor 24 preliminary identifies a region within collected image data with pixel colors or color attributes matching one or more colors of a reference color palette of the visual landmark definition 30.

In step S604, the data processor 22 determines observed image parameters for the candidate visual landmark 12. In a first example for carrying out step S604, the image processor may determine one or more of the following observed image parameters of the candidate visual landmark: an observed center, an observed centroid, an observed major axis length, an observed minor axis length, and an observed orientation of a bar or region of generally uniform color (e.g., a blue or magenta stripe) of the candidate visual landmark.

In a second example for carrying out step S604, the image processor identifies regions or bars in a candidate visual landmark 12, and the image processing software may determine image statistics (e.g., pursuant to the "regionprops" function of MATLAB) to determine whether the candidate visual landmark fulfills a visual landmark definition 30 to qualify as a genuine visual landmark 12.

In step S606, the image processor 24 determines whether the candidate visual landmark qualifies as a genuine or valid visual landmark 12 consistent with the established visual landmark definition and the observed image parameters. Step S606 may be carried out in accordance with various techniques that may be applied independently or cumulatively.

Under a first technique, if at least two observed visual parameters substantially conform to the reference visual parameters, the method continues with step S406 of FIG. 4. However, if at least two observed visual parameters do not substantially conform to the reference visual parameters, the method continues with step S405 of FIG. 4.

Under a second technique, if at least two observed visual parameters substantially conform to the reference visual parameters, the method continues with step S407 of FIG. 5. However, if at least two observed visual parameters do not substantially conform to the reference visual parameters, the method continues with step S405 of FIG. 5.

Under a third technique, if the observed center, observed centroid, observed major axis length, an observed minor axis length, and observed orientation of a bar or region of generally uniform color of the visual landmark 12 substantially matches the reference centroid, reference major axis length, reference minor axis length, and reference orientation, the image processor 24 may designate a candidate visual landmark 12 as a genuine or valid visual landmark 12. The method continues with step S406 of FIG. 4 if the candidate visual landmark 12 qualifies as a genuine or valid visual landmark 12.

However, if the observed center, the observed centroid, the observed major axis length, the observed minor axis length, and observed orientation of a bar or region of generally uniform color of the visual landmark 12 materially differs from the reference centroid, reference major axis length, reference minor axis length, and reference orientation, the image processor or identification module 24 may designate a candidate visual landmark 12 as an invalid visual landmark 12, and may or may not record its associated position (e.g., three dimensional coordinates). The invalid visual landmark 12 may constitute a flag, a birthday card, or some other similar object. The method continues with step S405 or S406 of FIG. 4 if the candidate visual landmark 12 does not qualify as a genuine or valid visual landmark 12.

The system and method for determining a position of a vehicle with reference to a landmark may be used indoors or outdoors. The system and method produced reliable and robust results. In a first example, if the range finder 20 is not functional, the system or method supports estimation of the position of the vehicle via the imaging unit 16 and distance estimator 27. In a second example, if the wireless device (e.g., radio frequency identification reader) is not available, the system or method supports estimation of the position of the vehicle via the imaging unit 16 and range finder 20. In a third example, the visual landmark 12 is obscured or not visible because of damage, darkness, glare, damage or theft, the wireless device 18 (e.g., radio frequency identification reader) may be used to estimate the location of the vehicle (e.g., that the vehicle is within a reception and/or transmission range of the tag, which may be limited to a maximum range).

Figure 8:
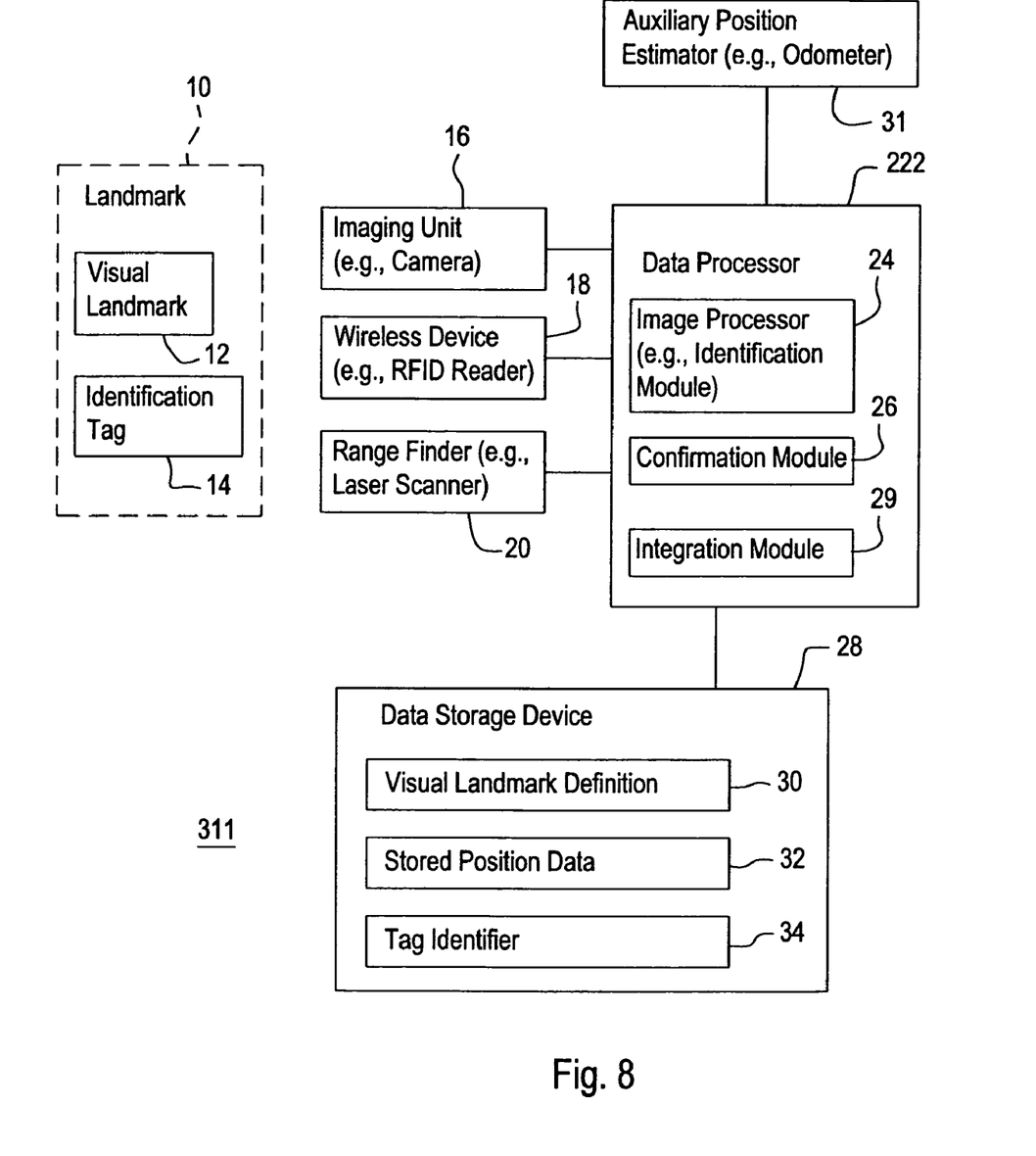
FIG. 8 is a fourth embodiment of a block diagram of a system for determining a position of a vehicle with reference to a landmark.

The system 311 of FIG. 8 is similar to the system 11 of FIG. 1, except the system of FIG. 311 further comprises a data processor 222 and an auxiliary position estimator 31. Like reference numbers in FIG. 1 and FIG. 8 indicate like elements.

The auxiliary position estimator 31 may comprise an odometer system, a dead-reckoning system, a location-determining receiver (e.g., Global positioning system receiver with differential correction), or another auxiliary position estimation system For instance, an auxiliary position estimator 31 may communicate with the data processor 222 to provide auxiliary or supplemental position data to the data processor 222. In such a case, the data processor 222 may further include an integration module 29 (e.g., a digital filter) to facilitate integration of the auxiliary position data into the estimate of the vehicular position or as a cross-check of reliability with respect to such estimate of the vehicular position. The integration module 29 may rely upon the auxiliary or supplemental position data to estimate vehicular position; particularly, when the vehicle is located between two landmarks or out of visual range of the imaging unit 16 to any landmark 10.

Figure 9:
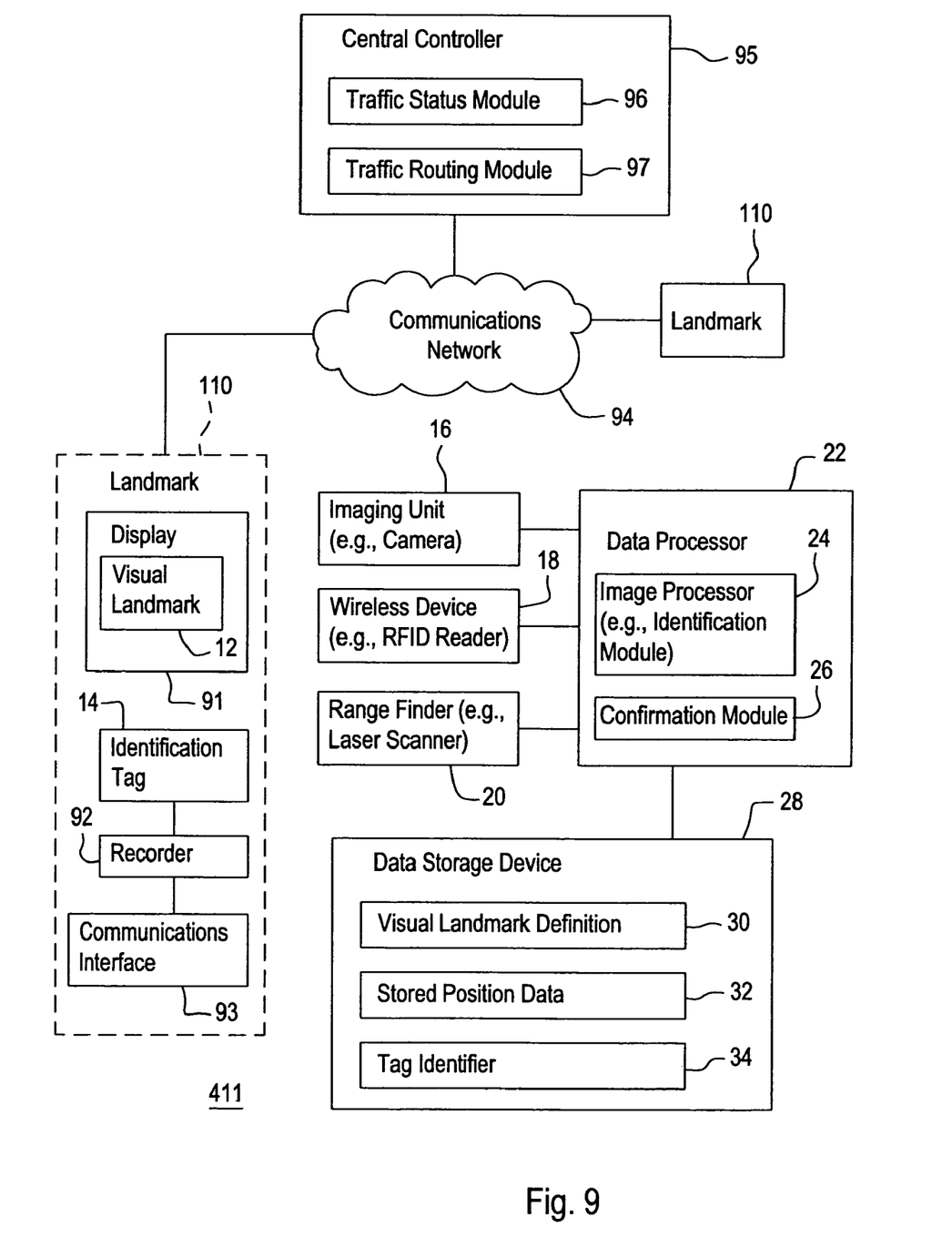
FIG. 9 is a fifth embodiment of a block diagram of a system for determining a position of a vehicle with reference to a landmark.

The system 411 of FIG. 9 is similar to the system 11 of FIG. 1, except the system of FIG. 411 further comprises a landmark 110, a communications network 94, and a central controller 95. Like reference numbers in FIG. 1 and FIG. 9 indicate like elements.

In FIG. 9, the landmark 110 comprises a display 91 for displaying one or more visual landmarks 12 and a recorder 92 coupled to the radio frequency identification tag 14 to record vehicle traffic information. The recorder 92 communicates with a communications interface 93. In turn, the communications interface 93 supports communication with a central controller 95 via a communications network 94. The central controller 95 comprises a traffic status module 96 for tracking a status of one or more vehicles in a work area (e.g., by vehicle identifier). The central controller 95 comprises a traffic routing module 97 for determining a route or path plan for the vehicle that avoids collisions with other vehicles and accomplishes a desired task. Further, the traffic routing module 97 may generate a control signal or traffic control data to be displayed on the display 91 as one or more semaphores and/or visual landmarks 12.

The recorder 92 records visits to the landmark 110 or passes by a defined zone about the landmark 110 in accordance with a vehicle identifier assigned to each corresponding vehicle and an associated date and time stamp. The recorded vehicle visit information may be communicated by a communications interface 93 via a communications network 94 to a central controller 95 to track and route multiple vehicles within the work area. For instance, the central controller 95 or traffic routing module 97 may use the recorded vehicle visit information to implement a semaphore or other machine readable visual indicator as a visual landmark 12 to indicate that a vehicle is in a warehouse aisle and that another vehicle should not enter the aisle. In such a case, a display 91 (e.g., liquid crystal display or plasma display) may be used to project visual landmarks that change to act as semaphores, to direct traffic of multiple vehicles equipped with systems 411. For example, the traffic routing module 97 generates a control signal or control data to the control the displayed visual landmark to direct or signal the vehicle (e.g., to enter an aisle or not to enter an aisle of an indoor work area).

In an alternate embodiment, the central controller 95 may log vehicle traffic with or without any traffic direction. For example, the central controller 95 may use the time stamp and the vehicle identifier to track a route of the vehicle throughout an indoor environment during a period of time and to provide a report to a user via a user interface coupled to the central controller 95. In yet another alternate embodiment, the central controller 95 may log actions of actuators and/or the image processor 24 at the landmark location such as the date and time a valve, fire extinguisher, or other item was inspected for presence and/or operational status.

Having described the preferred embodiment, it will become apparent that various modifications can be made without departing from the scope of the invention as defined in the accompanying claims.

The following is claimed:

1. A position determining system for a vehicle, the system comprising:
   an imaging unit for collecting image data from a vehicle;
   a wireless device for reading a radio frequency identification tag;
   an image processor for determining whether the collected image data contains a visual landmark;
   a confirmation module for determining whether the identified visual landmark is associated with a corresponding radio frequency identification tag having a particular tag identifier;
   a range finder for determining a position offset of the vehicle with respect to the identified visual landmark;
   a data processor for determining a vehicular position of the vehicle based on the determined position offset and a stored reference position associated with at least one of the visual landmark and the radio frequency identification tag.

2. The system according to claim 1 wherein the imaging unit comprises a camera that captures image data in at least one of the visual light spectrum and the infra-red light spectrum.

3. The system according to claim 1 wherein the wireless device comprises a reader for reading the radio frequency identification tag.

4. The system according to claim 1 wherein the range finder comprises a laser range finder for determining a multidimensional position of the visual landmark with respect to the vehicle.

5. The system according to claim 1 wherein the visual landmark comprises a pattern of colored regions distinctive from a background region in an indoor environment.

6. The system according to claim 1 wherein the visual landmark comprise a pattern of colored regions in a different portion of the color wheel from the background region.

7. The system according to claim 6 wherein the visual landmark comprises a pattern of colored regions selected from the group of blue and magenta and wherein the background comprises a warehouse, a retail store, or a storage location.

8. The system according to claim 1 further comprising:
   a storage device for storing a landmark definition of the visual landmark, a tag identifier associated with the visual landmark, and a reference position associated with the visual landmark.

9. The system according to claim 1 further comprising:
   a wireless communications interface for obtaining reference position data associated with at least one of the corresponding visual landmark and the corresponding particular tag identifier.

10. The system according to claim 1 further comprising:
    a central controller for tracking a traffic status of one or more vehicles;
    a recorder associated with the radio frequency identification tag for recording visit information of the vehicle with a time stamp and vehicle identifier assigned to the vehicle; and
    a communications interface for communicating the recorded visit information to the central controller.

11. The system according to claim 10 wherein the time stamp and the vehicle identifier is used to track a route of the vehicle throughout an indoor environment during a period of time.

12. The system according to claim 10 further comprising:

a display for displaying the visual landmark; and a traffic routing module for generating a control signal or control data to the control the displayed visual landmark to direct or signal the vehicle.

13. A position determining method for a vehicle, the method comprising:

collecting image data from a vehicle;

reading a radio frequency identification tag;

determining whether the collected image data contains a visual landmark;

determining whether the identified visual landmark is associated with a corresponding radio frequency identification tag having a particular tag identifier;

determining a position offset of the vehicle with respect to the identified visual landmark;

determining a vehicular position of the vehicle based on the determined position offset and a stored reference position associated with at least one of the visual landmark and the radio frequency identification tag.

14. The method according to claim 13 wherein the collecting comprises gathering image data in at least one of the visual light spectrum and the infra-red light spectrum.

15. The method according to claim 13 wherein the interrogating further comprises transmitting an interrogating signal and receiving a reply signal from the radio frequency identification tag to read the radio frequency identification tag.

16. The method according to claim 13 wherein determining the range comprises determining a three dimensional position of the visual landmark with respect to the vehicle.

17. The method according to claim 13 wherein the visual landmark comprises a pattern of colored regions distinctive from a background region in an indoor environment.

18. The method according to claim 13 wherein the visual landmark comprise a pattern of colored regions in a different portion of the color wheel from the background region.

19. The method according to claim 18 wherein the visual landmark comprises a pattern of colored regions selected from the group of blue and magenta and wherein the background comprises a warehouse, a retail store, or a storage location.

20. The method according to claim 13 further comprising:

storing a landmark definition of the visual landmark, a tag identifier associated with the visual landmark, and a reference position associated with the visual landmark.

21. The method according to claim 13 further comprising:

communicating via a wireless communications channel to obtain reference position data associated with at least one of the corresponding visual landmark and the corresponding particular tag identifier.

22. The method according to claim 13 further comprising:

recording a visit of the vehicle to a defined zone about the visual landmark with a time stamp and vehicle identifier.

23. The method according to claim 22 wherein the time stamp and the vehicle identifier is used to track a route of the vehicle throughout an indoor environment during a period of time.

24. The method according to claim 22 further comprising:

generating a control signal or control data to the control the visual landmark to direct or signal the vehicle.

25. A position determining system for a vehicle, the system comprising:

an imaging unit for collecting image data from a vehicle;

a wireless device for reading a radio frequency identification tag;

an image processor for determining whether the collected image data contains a visual landmark;

a confirmation module for determining whether the identified visual landmark is associated with a corresponding radio frequency identification tag having a particular tag identifier;

a distance estimator for determining a position offset of the vehicle with respect to the identified visual landmark;

a data processor for determining a vehicular position of the vehicle based on the determined position offset and a stored reference position associated with at least one of the visual landmark and the radio frequency identification tag.

26. The system according to claim 25 further comprising:

a linear feature detector to detect a linear feature in the visual landmark and to estimate an observed number of pixels associated with a detected linear feature at a given lens setting of the imaging unit;

the image processor comparing the observed number of pixels associated with the detected linear feature to a reference number of pixels at the given lens setting to estimate a distance or position offset between the vehicle and the visual landmark.

* * * * *